Sept. 22, 1959     O. KELM     2,905,061
INFINITELY VARIABLE AND THREE DIMENSIONAL PRECISION TEMPLATE
Filed June 19, 1958     2 Sheets-Sheet 1

INVENTOR.
OTTO KELM
BY
Woodhams, Blanchard and Flynn
ATTORNEYS

Sept. 22, 1959  O. KELM  2,905,061
INFINITELY VARIABLE AND THREE DIMENSIONAL PRECISION TEMPLATE
Filed June 19, 1958  2 Sheets-Sheet 2

INVENTOR.
OTTO KELM
BY
Woodhams, Blanchard and Flynn
ATTORNEYS

2,905,061
INFINITELY VARIABLE AND THREE DIMENSIONAL PRECISION TEMPLATE

Otto Kelm, Hagar Township, Berrien County, Mich.

Application June 19, 1958, Serial No. 743,184

4 Claims. (Cl. 90—15)

This invention relates in general to a milling machine and, more particularly, to apparatus for quickly, easily and accurately modifying or adapting a tracer controlled milling machine to perform precision milling operations, such as those performed by a conventional rotary head milling machine or similar equipment.

Generally speaking, milling machines, such as those used for diesinking, are divided into two major classes which, for convenience, may be referred to as precision milling machines, designed to produce geometrically defined surfaces, and tracer controlled milling machines, designed to be useful in cases where surfaces not easily defined geometrically (that is, irregular contours), are to be produced. The first class includes milling machines wherein relative movements between the milling tool and the workpiece supporting device are accurately controlled by mechanical adjusting mechanism associated with one or both of the milling tool and the workpiece supporting device. Often, the vertical movement and its control is associated with the tool engaging apparatus, and the horizontal movement and control are associated with the workpiece supporting device. Thus, by proper operation of the controls, the milling tool and workpiece supporting device can be accurately moved relatively and with respect to the frame structure of the machine into an infinite number of predetermined positions. In this class of machines the workpiece is often mounted upon a compound table which is in turn supported by a rigid base table secured to the machine frame structure. However, the operations performed upon the workpiece by these machines are limited to regular, geometric shapes or cuts which are produced by operating the control mechanism of the machine according to predetermined dimensions or settings. Where the finished product contains irregular contours of shapes which are not readily reduced to settings or dimensions, the precision milling machine will not do the job. Instead, a tracer controlled or copy milling machine must be used.

It is well known that one type of tracer controlled milling machine is comprised of a frame structure upon which a milling head is movably supported, usually for two dimensional movement in a substantially horizontal plane. A milling tool and a tracer stylus, which is connected to hydraulic, or electronic tracer systems, are adjustably supported upon the milling head for simultaneous vertical movement above a work supporting table rigidly secured to the machine frame. Thus, a workpiece supported upon one end of the table is operated upon by the milling tool in response to movement of the tracer stylus along the surface of a pattern or model supported upon the other end of the table. Just as the precision milling machine is incapable of providing accurate cuts for which neither dimensions nor settings are provided, the tracer controlled milling machine is incapable in its existing form of accomplishing accurate cuts without a model. That is, the product of the tracer controlled milling machine is only as accurate as its model and such machine is not useful unless some form of model is provided.

Accordingly, a shop offering complete milling, such as diesinking, services is presently required to have both a precision milling machine, such as a vertical mill, as well as a tracer controlled milling machine having a model tracing stylus. In fact, it often happens that part of the milling operation must be performed on one type of machine after which the workpiece is then moved to the other type of machine for the purpose of completing the operation. Needless to say, these milling machines are very expensive and, therefore, the cost of producing the dies by these machines is likewise expensive.

As indicated above, some jobs can be performed only in those shops which are large enough to be able to afford both types of machines. However, even where the job can be performed by a conventional vertical mill, another problem arises where it is necessary to produce several pieces having exactly the same shape. Presently, the first piece is prepared on a precision milling machine, if it is regular in shape, and then used as a model to guide a tracer controlled mill in quickly producing the remaining pieces. If no tracer mill is available, each piece must be produced in a time consuming manner by a plain vertical mill.

Vertical or precision milling machines are very limited in their range of movements, particularly in a vertical direction. Furthermore, all movements must be effected by the application of sheer mechanical force. On the other hand, the stylus, hence the tool, on a tracer controlled milling machine can be moved or deflected with a few ounces of force.

In considering these long standing problems, it occurred to me that much time and money could be saved if one of the two classes of milling machines could be arranged so that it could be quickly and easily modified or adapted to perform the operations normally restricted to the other class of machines as well as performing its own normal operations. Although the following description is directed to a tracer controlled milling machine having an attachment embodying the invention, it will be understood that such disclosure is for illustrative purposes only, and is not intended to limit the invention. That is, the invention could be embodied in an adapter or could be an integral part of the tracer type milling machine by appropriate modification thereof. For the purpose of convenience in reference, the two classes of milling machines will be referred to hereinafter as a precision milling machine and a tracer or copy milling machine.

Accordingly, a primary object of this invention has been the provision of a milling machine construction capable of performing the functions of both a precision milling and a copy milling machine.

A further object of this invention has been the provision of a milling machine, as aforesaid, wherein the milling tool can be moved in precise geometrically defined paths with much less mechanical force than presently required to move such tool on a conventional vertical milling machine.

A further object of this invention has been the provision of an attachment for a copy milling machine, said attachment having infinitely variable and precisely controllable mechanism engageable with the tracing stylus of said copy milling machine for converting same into a precision milling machine.

A further object of this invention has been the provision of an attachment, as aforesaid, whereby three dimensional movement and positioning of the milling tool on a copy milling machine can be accurately and precisely effected according to predetermined dimensions and/or settings and without altering in any way the usual operating functions of the copy milling machine.

A further object of this invention has been the provision of an attachment, as aforesaid, mountable upon or integral with the table of a copy milling machine and having mechanism engageable with the tracer stylus of said machine for effecting a precise and predetermined movement thereof.

A further object of this invention is the provision of an adapter, as aforesaid, which is inexpensive to produce, by comparison with the cost of the machines which it replaces, which is extremely accurate but very simple in operation, which requires little or no maintenance and which is easily adaptable to use with existing types of copy milling machines.

Other objects and purposes of this invention will become apparent to persons familiar with this type of equipment upon reading the following specification and examining the accompanying drawings, in which.

Figure 1:
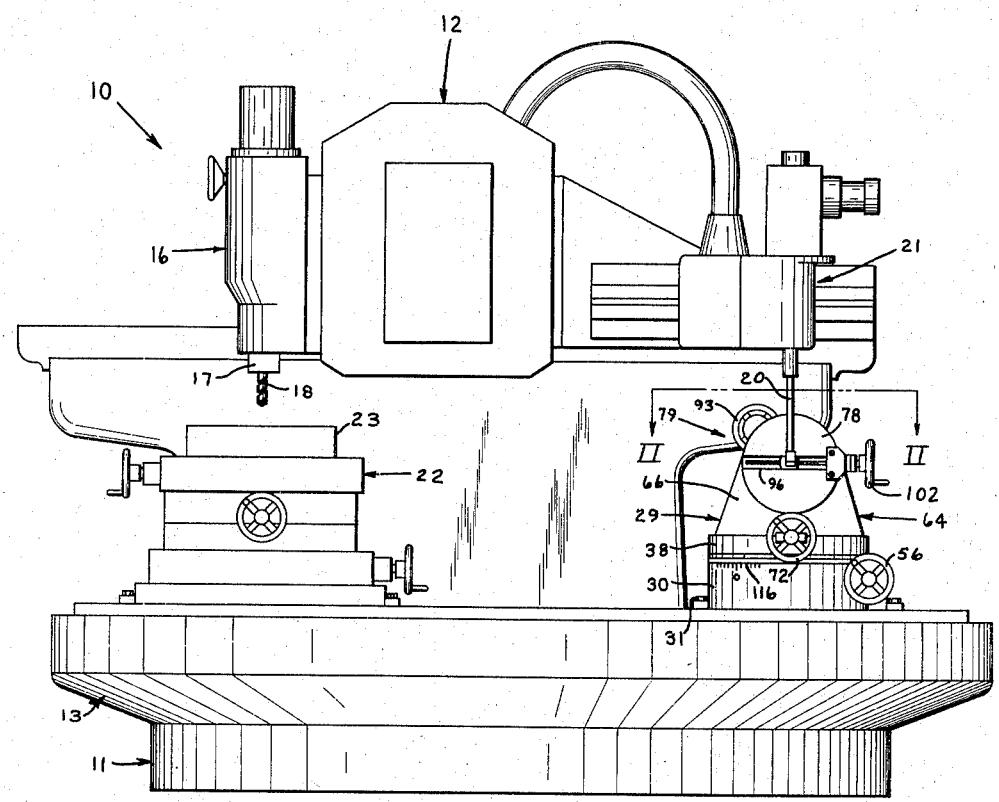
Figure 1 is a front elevational view of a tracer controlled milling machine provided with an adapter embodying the invention.
Figure 3:
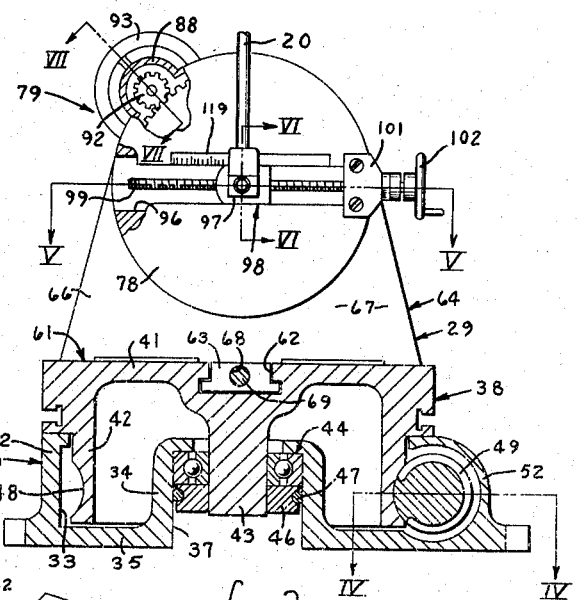
Figure 3 is a broken sectional view substantially as taken along the line III—III of Figure 2.

For the purpose of convenience in description, the terms "upper," "lower," "left," "right" and derivatives thereof will have reference to the milling machine and adapter as appearing in Figures 1 and 3 which disclose their normal positions of operation. The term "front" and derivatives thereof will have reference to that side of the machine and adapter appearing in Figures 1 and 3. The terms "inner," "outer" and derivatives thereof will have reference to the geometric center of said machine and/or said adapter.

General description

The objects and purposes of the invention, including those set forth above, have been met by providing an attachment for a tracer controlled or copy milling machine having an upright frame structure upon which a milling head is supported for movement in a substantially horizontal plane. A tool supporting device and a tracing stylus are adjustably supported upon said milling head above a work supporting table which is rigidly mounted upon the frame structure of the machine. A workpiece support is removably supported upon one portion of the table for holding said workpiece in working relationship with respect to a tool held by said supporting device. An infinitely and accurately variable attachment is supported upon another portion of the table for engagement and movement of the tracer stylus. The tool is moved with respect to the workpiece in response to, and in the same path as, the movements of the stylus.

The milling machine may be of a substantially conventional type, such as that designated as the "8″ by 18″ Tool and Die Milling Machine" manufactured by the Cincinnati Milling Machine Company, Cincinnati, Ohio and shown in their publication No. M–1731.

Detailed description

The milling machine 10 (Figure 1), which has been selected to illustrate a preferred embodiment of the invention, is comprised of an upright frame structure 11 supporting a control head 12 for two dimensional movement in a substantially horizontal plane. A horizontal work table 13 is rigidly secured to and extends frontwardly from the frame structure 11 beneath the front end of the control head 12. A tool holding device 16 is supported upon the left side of the control head 12 and includes a vertically movable spindle 17 for engaging a milling tool 18.

The tracing apparatus 21, which supports a tracing stylus 20, is adjustably supported upon the control head 12 for selected spacing with respect to the tool holder 16. A compound workpiece supporting table 22 is mounted upon the leftward end of the rigid table 13 for adjustably supporting a workpiece 23 with respect to the milling tool 18.

Structure of the type described above may be substantially conventional and as shown in the above mentioned publication No. M–1731 of the Cincinnati Milling Machine Company. Further structure of this general character is disclosed in the publication of Nassovia Maschinenfabrik Hanns Fickert G.m.b.H., Frankfurt am Main, Germany, which publication is identified as 272E–4509–53.

As shown in Figure 1, the variable attachment or adapter 29, to which this invention principally relates, includes a mounting base 30 which may be secured in a conventional manner upon the rigid table 13 by means of lock bolts 31. The mounting base 30 has an upright shell 32 defining a circular cavity 33. The bottom wall 35 of the cavity 33 has an integral upstanding sleeve 34 concentric with, and spaced inwardly from, said shell 32. The sleeve 34 has a cylindrical coaxial bore 37.

The variable attachment 29 also includes a rotary adjustment member 38 comprised of a circular top plate 41 supported upon the upper edge of the shell 32 and having a cylindrical, coaxial and downwardly extending flange 42 of reduced diameter extending into the circular cavity 33. Said rotary adjustment member 38 also has a coaxial and integral shaft 43 which extends downwardly from the top plate 41 coaxially into the bore 37 of the sleeve 34. The shaft 43 is rotatably supported within, and spaced from the walls of, the bore 37 by means of the bearing 44. The shaft 43 has at its lower end an oil seal and a bearing adjusting nut comprised of the internally threaded collar 46 secured to, and supported upon, the lower end of the shaft 43 and an O-ring 47 snugly disposed between the periphery of the collar 46 and the adjacent, inner surface of the sleeve 34.

The periphery of the cylindrical flange 42 is provided near its lower axial end with gear teeth 48 which are engaged by the worm 49. The worm 49 is mounted upon, and rotatable with, a substantially horizontal shaft 53 which is rotatably supported within the housing 52 by means of the bearings 54. The housing 52 is preferably integral with, and an extension of, the shell 32 on one side thereof. A hand wheel 56 is mounted upon the front or outer end of the worm shaft 53 for the purpose of rotating same and the graduated collar 57 is also mounted upon said shaft 53 for indicating the amount of such rotation.

Figure 2:
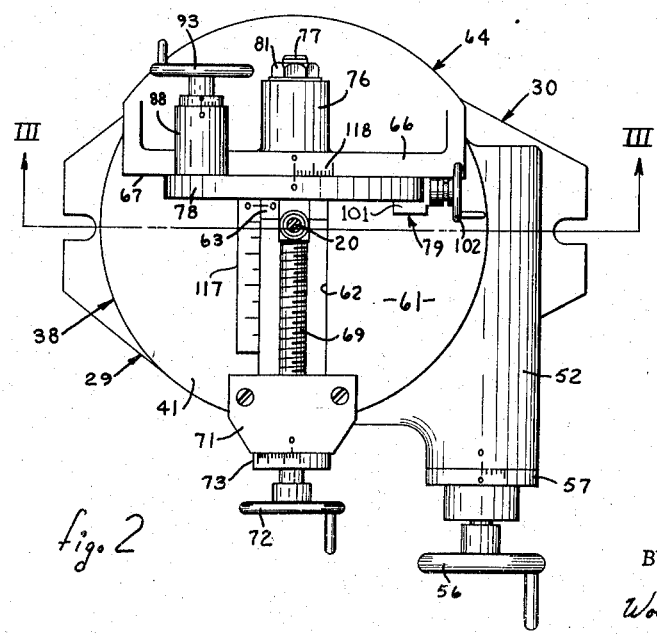
Figure 2 is a sectional view taken along the line II—II of Figure 1.

The upper surface 61 (Figures 2 and 3) of the top plate 61 is provided with a diametrically disposed groove 62 into which the slider 63 of a transverse or horizontal adjusting member 64 is slidably received. The transverse member 64 includes a substantially vertical back plate 66, the front surface 67 of which preferably lies within a plane perpendicular to the lengthwise extent of the groove 62. The slider 63 has a threaded opening 68 through which the screw 69 (Figure 3) is threadedly received. The screw 69 is rotatably supported within the groove 62 by means of the bearing block 71 (Figure 2) mounted upon the rotary adjusting member 38 at the front end of the groove 62. A hand wheel 72 is mounted upon the front end of the screw 69 for rotating same and a graduated collar 73 is also supported upon the screw 69 near its front end for indicating the rotational movement thereof with respect to the rotary adjusting member 38.

A hub 76 (Figures 2 and 5) is supported upon and extends rearwardly from the back plate 66 and rotatably supports a shaft 77 for movement about an axis preferably disposed directly above and parallel with the centerline of the groove 62. The front end of the shaft 77 is secured to and coaxial with the disk 78 of the vertical adjusting member 79. The rearward end of the shaft 77 is threadedly engaged by a nut 81 for holding said shaft and said vertical member 79 with respect to the hub 76.

Figure 7:
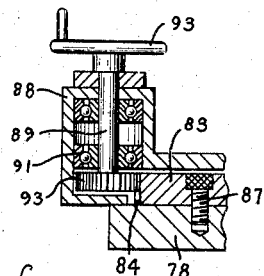
Figure 7 is a sectional view taken along the line VII—VII of Figure 3.
Figure 5:
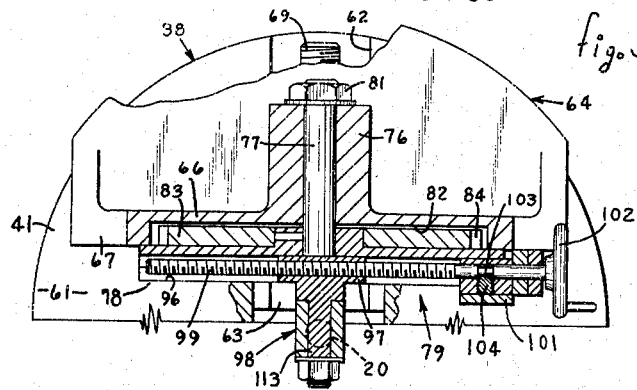
Figure 5 is a sectional view substantially as taken along the line V—V of Figure 3.
Figure 4:
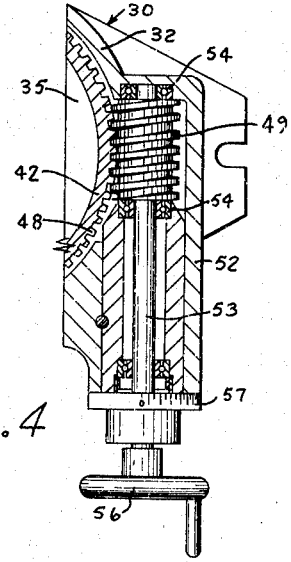
Figure 4 is a sectional view substantially as taken along the line IV—IV of Figure 3.

As shown in Figures 5 and 7, a circular recess 82 is provided in the front surface 67 of the back plate 66 concentric with the shaft 77. A gear 83 having teeth 84 is supported upon the shaft 77 adjacent to the rear side of the disk 78 and secured to said disk by means such as the bolts 87 (Figure 7). The back plate 66 has an integral gear and shaft housing 88 near its upper edge in which a shaft 89 is rotatably supported by the bearings 91 for rotation about an axis parallel with the axis of the shaft 77. A pinion 92 is supported upon the front end of the shaft 89 for engagement with the teeth 84 of the gear 83. A hand wheel 93 is supported upon the rear end of the shaft 89 for rotating said shaft. Accordingly, rotation of the disk 78 hence the vertical adjusting member 79 can be effected by means of the hand wheel 93.

Figure 6:
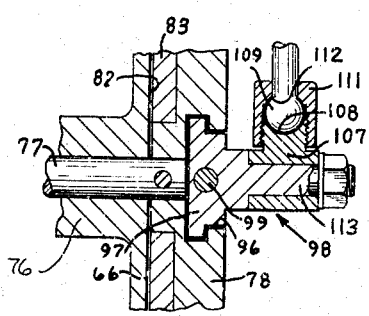
Figure 6 is a sectional view taken along the line VI—VI of Figure 3.

The disk 78 is provided with a diametrically disposed groove 96 (Figures 3, 5 and 6) in which the slider 97 of the stylus engaging member 98 is slidably disposed. A screw 99 is rotatably supported near one end thereof by the bearing block 101 supported upon the disk 78 adjacent to one end of the groove 96. A hand wheel 102 is removably supported upon the said one end of the screw 99 for the purpose of rotating same. Means, such as the annular groove 103 in the screw 99 and a pin 104 in the bearing block 101, which extends into the groove 103, prevent axial movement of the screw 99 with respect to the bearing block 101 during rotation of said screw. Similar structure may be utilized for preventing axial movement of the screw 69 with respect to the bearing block 71.

The stylus engaging member 98 includes an upright, externally threaded post 107 having a substantially hemispherical cavity 108 in its upper surface for reception of the spherical lower end 109 on the stylus 20. The sleeve 111 is internally threaded near one end for engagement with said post 107, and has a spherically shaped internal surface 112, which snugly embraces the upper portion of the spherical end 109 can be pivoted about the lengthwise axis of the stylus 20 with respect to the member 98. The post 107 is pivotally supported upon a rod 113 which extends frontwardly from the slider 97. The axis of the rod 113 is parallel with the axis of the shaft 77 and intersects the center line of the groove 103. Thus, the disk 78 and the slider 97 can pivot with respect to the stylus 20 around both a vertical axis and a horizontal axis during the operation of the variable attachment 29.

Operation

The milling machine 10, which is of the tracer controlled type, is prepared for operation according to the present invention by supporting a workpiece 23 upon a compound table 22 infinitely variable longitudinally and transversely with respect to the attachment 29, for treatment by the milling tool 18 in a substantially normal manner. The attachment 29 is then mounted, as by means of the bolts 31, upon the rigid table 13 below the tracing apparatus 21. The stylus 20 is removed from the tracing device 21 so that its shank can be inserted through the sleeve 111 after which the stylus is re-engaged by the device 21. The spherical end 109 of the stylus 20 is placed into the cavity 108 at the upper end of the post 107 and the sleeve 111 is screwed onto the post 107 until said spherical end 109 is snugly but pivotally held between the sleeve 111 and the post 107. Where necessary, the control head 12, including the tool holding device 16 and tracing device 21, is now unlocked and rendered movable with respect to the frame structure 11. The hand wheels 56, 72, 93 and 102 (Figure 1) are rotated until the various members which they control are placed in the zero position, as indicated by the scale 116 (Figure 1), the scales 117 and 118 (Figure 2) and the scale 119 (Figure 3). The control head 12 is thus held against any movement with respect to the table 13. By adjusting the spindle 17 and the compound table 22, the workpiece 23 is properly positioned with respect to the milling tool 18, hence the stylus 20. The entire machine, including the attachment 29, is now prepared for operation.

Cuts are made in the workpiece 23 by means of the milling tool 18 in response to predetermined movements of the spherical end 109 of the stylus 20, which movements are controlled by operation of the hand wheels 56, 72, 93 and 102. By operating the hand wheel 56, the stylus 20 will be moved in a concentric circle around the center of its initial or zero position. By rotating the hand wheel 72, the stylus 20 will be moved in a horizontal direction radially of the movement effected by hand wheel 56. By turning the hand wheel 102, the stylus 20 can be moved transversely of the horizontal movement caused by hand wheel 72. By rotating the hand wheel 93, the stylus can be moved upwardly or downwardly, depending upon the location of the stylus engaging member 98, the movement of which is controlled by the hand wheel 102. That is, upward and downward movement of the stylus 20 can be effected through an arcuate path by the hand wheel 93 or in a directly vertical path by means of the hand wheel 102 after proper adjustment has been made by the hand wheel 93. The mechanism of the milling machine 10 translates these movements of the stylus 20 into identical movements of the milling tool 18.

Accordingly, it will be seen that the milling tool 18 can be moved with respect to the workpiece 23 with precisely the same accuracy as that produced by a conventional, precision-type milling machine. However, when it becomes desirable to use the milling machine 10 for copy milling, such can be done easily by removing the adapter 29 from the rigid table 13 and replacing it with the pattern or template to be traced. Furthermore, because as little force is required to move the stylus 20, the attachment 29 can be fabricated from light weight parts with the precision of a delicate instrument, thereby materially increasing the accuracy of the cutting operation and reducing the cost of fabrication.

The attachment 29 is capable of performing three dimensional operations. However, it is obvious that, by ignoring certain of the adjustments on the attachment 29, one and two dimensional operations can be performed with equal ease.

It will be recognized that the structure embodied in the attachment 29 may be incorporated into the milling machine 10 as an integral part thereof and so located that it will not interfere with the tracing function of the machine or that portion of the table 13 upon which a model or pattern is normally placed. Thus, although a particular preferred embodiment of the invention has been disclosed above for illustrative purposes, it will be understood that variations or modifications of such disclosure, which lie within the scope of the appended claims, are fully contemplated.

What is claimed is:

1. In a multi-purpose machine having an upright frame, a control head movably mounted upon said frame, tool supporting means adjustably supported upon said head, a stylus adjustably supported upon said head, said tool supporting means and said stylus being spaced from each other and simultaneously movable through identical paths with respect to said frame, and a work supporting table secured to said upright frame below both said tool supporting means and said stylus, the combination comprising: a mounting base supportable upon said table beneath said stylus; a first member rotatably supported upon said base and manually controllable means for effecting rotary movement of said first member with respect to said base about a substantially vertical axis; a second member supported upon said first member and manually controllable means including a cross slide for effecting movement of said second member diametrically of said first member; a third member rotatably supported upon said second member for movement about a horizontal axis intersecting and perpendicular to said vertical axis, and manually controllable means for effecting rotary movement of said third member with respect to said first member around said horizontal axis; a stylus engaging member slidably supported upon said third member; and manually controllable means for effecting movement of said stylus engaging member diametrically of said third member, whereby said stylus and said tool engaging means can be simultaneously and accurately moved into an infinite number of positions with respect to said work supporting table.

2. The structure of claim 1 wherein said means effecting movement of said first member with respect to said mounting base includes a ring gear on said first member concentric with the rotational axis thereof, a worm rotatably supported upon said mounting base and engaged with said gear, and means for rotating said worm.

3. The structure of claim 1 wherein said second member includes an upright plate parallel with the rotational axis of said first member, and wherein said means effecting rotation of said third member with respect to said second member includes a ring gear fixed with respect to said third member and concentric with the rotational axis thereof, a pinion engaged with said ring gear and rotatably supported upon said second member, and means for effecting rotation of said pinion about an axis parallel with the axis of said ring gear.

4. In a multi-purpose machine having an upright frame, a control head mounted upon said frame, tool supporting means mounted upon said head for movement with respect to said frame and in any direction and a work-supporting table secured to said upright frame below said control head, the combination comprising: a stylus supported upon said head for movement with respect to said frame and in any direction; mechanism effecting movement of said tool supporting means simultaneously with, and in response to movement of said stylus; a mounting base secured upon said table below said stylus; a first member rotatably supported upon said mounting base for movement around a substantially vertical axis; means including a gear concentrically secured to said first member and a worm engaged with said gear and rotatably supported upon said mounting base for effecting rotary movement of said first member around said vertical axis; a second member slidably supported upon said first member for movement in a substantially horizontal plane; manually operable means including a nut on said second member and a screw engaged with said nut and rotatably supported upon said first member for effecting said movement of said second member with respect to said first member, said screw passing through said vertical axis; a third member rotatably supported upon said second member for movement around a horizontal axis perpendicular to and continuously intersecting said vertical axis; manually operable means including a gear concentrically secured to said third member and a pinion engaged with said gear and rotatably supported upon said second member for effecting rotation of said third member around said horizontal axis; a fourth member slidably supported upon said third member for movement diametrically thereof said fourth member having means releasably engageable with said stylus; and manually operable means including a nut on said fourth member and a screw engaged by said nut and rotatably supported upon said third member for effecting said movement of said fourth member with respect to said third member, whereby said tool engaging means can be moved along a straight line in any direction.

References Cited in the file of this patent

UNITED STATES PATENTS

| 2,239,625 | Roehm et al. | Apr. 22, 1941 |
| 2,432,058 | Wiken et al. | Dec. 2, 1947 |
| 2,818,000 | Zwick | Dec. 31, 1957 |

FOREIGN PATENTS

| 841,112 | Germany | June 13, 1952 |